United States Patent
Ogilvie, Jr. et al.

[11] Patent Number: 6,113,981
[45] Date of Patent: *Sep. 5, 2000

[54] PROCESS FOR COATING PAPERBOARD WITH A WATER-DISPERSIBLE POLYESTER POLYMER

[75] Inventors: Morgan O. Ogilvie, Jr.; Paul M. Whatley, Jr., both of Birmingham, Ala.; Michael W. Olvey, Fairburn, Ga.

[73] Assignee: Madison-Oslin Research, Birmingham, Ala.

[ * ] Notice: This patent issued on a continued prosecution application filed under 37 CFR 1.53(d), and is subject to the twenty year patent term provisions of 35 U.S.C. 154(a)(2).

[21] Appl. No.: 09/195,172

[22] Filed: Nov. 17, 1998

[51] Int. Cl.$^7$ ............................... B05D 1/28; B05D 3/08
[52] U.S. Cl. ...................... 427/223; 427/316; 427/317; 427/348; 427/365; 427/361; 427/391; 427/428
[58] Field of Search .................... 427/223, 316, 427/348, 391, 317, 361, 365, 369, 371, 428

[56] References Cited

U.S. PATENT DOCUMENTS

| | | | |
|---|---|---|---|
| Re. 29,272 | 6/1977 | Hintx et al. . | |
| 3,119,708 | 1/1964 | Munck | 427/316 |
| 3,432,339 | 3/1969 | Howell et al. | 427/391 |
| 3,960,650 | 6/1976 | Parks et al. . | |
| 4,104,222 | 8/1978 | Date et al. . | |
| 4,528,321 | 7/1985 | Allen et al. | 524/761 |
| 4,977,191 | 12/1990 | Salsman | 521/48 |
| 5,116,889 | 5/1992 | Gilbert et al. . | |
| 5,152,872 | 10/1992 | Racine et al. . | |
| 5,281,630 | 1/1994 | Salsman . | |
| 5,382,464 | 1/1995 | Ruppel et al. . | |
| 5,466,493 | 11/1995 | Mefford et al. . | |
| 5,622,599 | 4/1997 | Sproule et al. . | |
| 5,726,277 | 3/1998 | Salsman . | |
| 5,772,819 | 6/1998 | Olvey | 156/82 |

OTHER PUBLICATIONS

Michelman, Waterbased Technology Worldwide, Coatings for Corrugated http://www.michem.com/gluel.htm; Aug. 18, 1998; (About Gluability).

Michelman, Waterbased Technology Worldwide; Coatings for Corrugated; (VaporCoat Series):http://www.michem.com/vc.htm; Aug. 18, 1998.

"Water vapor transmission rate of sheet materials at standard temperature and humidity"; T 448 om–89; Approved by the Physical Properties Committee of the Process and Product Quality Division (No Date).

*Primary Examiner*—Katherine A. Bareford
*Attorney, Agent, or Firm*—Harold Marquis; Troutman Sanders, LLP

[57] ABSTRACT

A method for coating paperboard comprising heating paperboard to a temperature sufficient to remove at least some moisture from the paperboard; applying an aqueous dispersion of at least one water-dispersible polymer to the paperboard product; heating the paperboard to at least partially cure the water-dispersible polymer; and cooling the paperboard to at least 160 degrees Fahrenheit to reduce the tackiness of the cured water-dispersible polymer.

12 Claims, 1 Drawing Sheet

PROCESS FOR COATING PAPERBOARD WITH A WATER-DISPERSIBLE POLYESTER POLYMER

BACKGROUND OF THE INVENTION

1. Field of the Invention

This invention relates to a method and apparatus for coating paperboard and, more specifically, a method and apparatus for producing coated paperboard products with a low moisture vapor transmission rate (MVTR), excellent glueability, printability, and recyclability.

2. Description of the Related Art

Corrugated board is a converted or remanufactured paper product. It is a layered structure that is usually die cut to form corrugated containers. It consists of a fluted corrugated medium sandwiched between sheets of linerboard. The simplest three-ply structure is known as "double face." As recently as 1990, much of the linerboard was made entirely from virgin, long-fibred, softwood, kraft pulp. Today, however, these board grades contain sizeable portions of recycled old corrugated containers (OCC) and many are made from 100% OCC.

Around the country, and even around the world, landfill space for waste disposal is rapidly reaching capacity. By the year 2000, paper and paperboard products are projected to represent 40.9 percent of the municipal solid waste stream and may climb to nearly 42 percent by 2010. New governmental regulations and the public's increasing concern for the environment have created pressure to remove these materials from the solid waste stream. The most widely utilized method of reducing paper waste is recycling.

OCC has a history of efficient recycling use. Even before the era of government mandates and self-imposed industry goals, almost 50% of OCC was recycled in North America. Today's recovery rate is about 62%. It is expected that a level of 70% will be achieved by the year 2000. Today, most of this recycled material goes directly from retail chain stores to mills based on long-term contracts. The rest comes from municipal curbside collection and wastepaper dealers. Some OCC is used in the production of boxboard, and some is even bleached and used in the production of fine paper, but most OCC is used again to produce corrugating medium and linerboard.

"Repulping" refers to any mechanical action that disperses dry or compacted pulp fibers into a water slush, slurry or suspension. The action can be just sufficient to enable the slurry to be pumped, or it can be adequate to totally separate and disperse all the fibers. In a typical recycling process, bales of OCC are fed into a repulper where the material is disintegrated and the gross contaminants are removed. The resulting stock is pumped through pressure screens and cyclonic cleaners to remove oversized materials and foreign matter. Plastics, styrofoam or other lightweight contaminants are removed by reverse cleaners. The glue, staples, wax, and tapes originally used to assemble the corrugated box must be removed.

Untreated OCC usually creates no problems for recycling. However, paperboard is often treated or coated to enhance its performance and these coatings render the paper unrecyclable. For example, corrugated paperboard is often treated with a curtain coating, wax impregnation, lamination, sizing, or a water-based coating to reduce abrasiveness and to provide for oil and moisture resistance. While coatings such as wax enhance the moisture resistant properties of the paperboard, the wax coating process is expensive and often renders the paperboard unrecyclable. Therefore, a need exists in the art for a coating system that enhances the usability of corrugated boxes while still allowing the containers to be recycled.

While various coatings have been introduced in the market to provide a recyclable coating, they suffer from limitations such as printability and gluablity. Some repulpable coatings cannot be printed over due to a high degree of water resistance or the release characteristics of the coating. While some repulpable coatings may be printable, they require special inks. More detrimentally, many currently available repulpable paperboard coatings are not compatible with all glues. For example, some coatings are compatible only with hot-melt adhesives only, while others, by nature of their heat-resistant and oil-resistant properties, repel the oil-based hot-melt adhesives. Therefore, a need exists in the art for a coating system that is compatible with a broad range of printing and gluing systems.

Moisture vapor transfer rate (MVTR) is a scientific measurement used to describe a product's ability to allow moisture vapor to pass through it, over a specific time period, at a controlled temperature and at a designated atmospheric pressure. Products as diverse as frozen meat patties and fine papers are extremely sensitive to moisture gain or loss. In the case of meat patties, excessive loss of moisture while product is being held in a freezer results in "freezer burn." Freezer burn is unsightly and adversely affects the taste of the cooked meat. For fine papers, excessive moisture gain results in limp, hard-to-process sheets. Traditional solutions generally involve plastic film, either as a laminate with the paper or as a bag around the product. Both solutions are expensive or incur added labor costs, and greatly reduce or eliminate the recyclability of the shipping container. Therefore, there exists a need in the art for coatings that can provide the high moisture resistance needed without compromising the recyclability of the container.

The MVTR of a container is dependent not only upon the coating on the corrugated paperboard, but also the method by which that coating is applied. Traditional methods of coating application, such as a rod coater or a blade coater, may result in variations in coating thickness that will cause variations in the MVTR of the coating. The typical solution to this problem has been to merely increase the amount of coating applied to the paperboard. This solution can be expensive and does not result in a consistently coated product both linearly and across the web. Therefore, a need exists in the art for a process for applying a uniform coating to paperboard with very little variation in MVTR.

SUMMARY OF THE INVENTION

It is, therefore, an object of this invention to provide a coating system that reduces the MVTR of the paperboard product while still allowing the product to be recycled.

It is a further object of the present invention to provide a coating system that is compatible with a broad range of printing and gluing systems.

It is yet another object of the present invention to provide a process for applying a uniform coating to paperboard so that there is very little variation in MVTR of the coated paperboard.

These and further objects of the invention are provided by a method and apparatus for producing coated paperboard with a low MVTR, excellent glueability, printability, and recyclability.

The method of the present invention comprises flame-treating a paperboard product to remove surface fibers and debris, preheating the paperboard product, coating the paperboard product with a water-dispersible polymer suspension with an air-knife coater, applying heat to the coated paperboard product to dry and cure the coating, and cooling the paperboard product.

The apparatus of the present invention comprises a flame treating means, a heating means, contour coating means for applying a water-dispersible polymer to at least one surface of the paperboard product, drying means for curing the coating, and cooling means for reducing the temperature of the coating on the paperboard product.

BRIEF DESCRIPTION OF THE DRAWINGS

Having thus generally described the nature of the invention, reference will now be made to the accompanying single drawing showing by way of illustration a preferred embodiment thereof and, more particularly, a diagrammatic representation of an apparatus in accordance with the present invention.

DESCRIPTION OF THE PREFERRED EMBODIMENT

Figure 1:
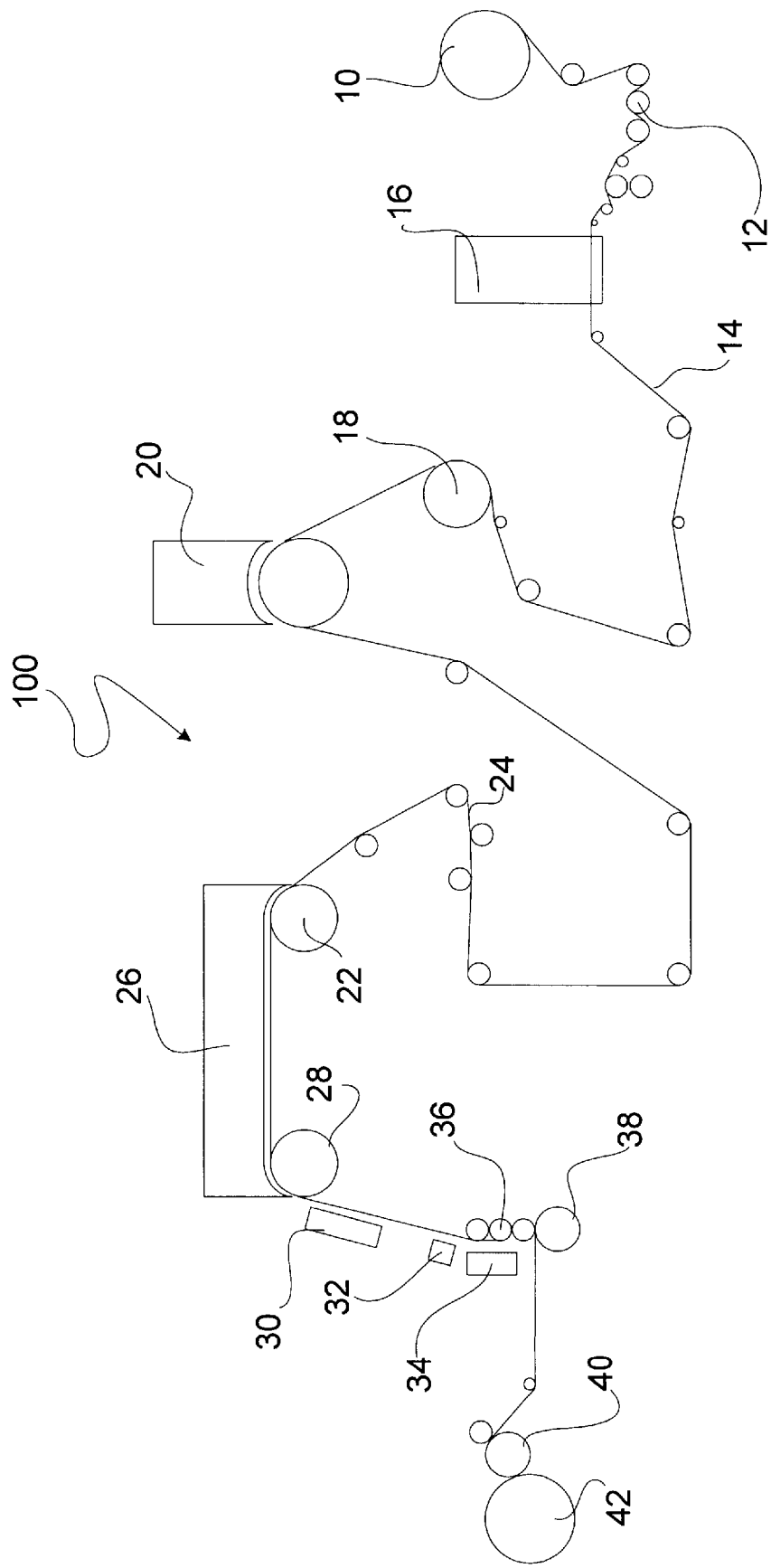

Referring to FIG. 1, there is illustrated a diagrammatic representation of an apparatus 100 for and the process of making the coated paperboard product. The apparatus 100 can be either in-line (i.e., part of the paperboard making machine) or off-line. If the apparatus 100 is off-line the paperboard is unrolled from a raw stock roll 10 and fed into the paster assembly 12. The paster assembly 12 joins the end of one roll of paperboard to a second roll to allow continuous processing between rolls.

As used herein, "paperboard" refers to a web of cellulosic fibers in sheet form. The paperboard used in the present invention generally may be any paperboard suitable for folding cartons or corrugated board or as a substrate for laminating to a backing such as gypsum board. The term paperboard includes paper and paperboard of different thicknesses. The preferred paperboard is virgin kraft paperboard of a weight known as liner board. As is well known in the art, kraft paperboard is produced by a chemical cooking process using sodium hydroxide and sodium sulfide, and there are many different types of kraft paperboard manufactured with various additives and treatments for various applications. The invention may also make use of reprocessed paperboard, that is, not virgin kraft paperboard.

A surface treatment may be employed as part of the conversion process to alter the surface characteristics of the specific material being used. Typical surface treatment processes include altering the wettability of a substrate, improving the bondability of an applied material or the elimination of an accumulated static charge. Surface treatment technologies can play a key role in the preparation of surfaces of paperboard for subsequent processing steps. From the paster 12, the paperboard 14 is fed through flame treating means, comprising a flame treater 16 where the surface to be coated is flamed by one or more gas burners to burn off loose fibers and debris, and reduce the water content of the paper. The flame treatment of the present invention has several benefits. Most importantly, it provides a better paper surface by burning off loose fibers and other surface matter that would interfere with a continuous coating. The loose fibers, if not removed by the flame treatment, would cause disturbances in the coating, and provide a conduit for moisture to pass through the coating. This process, commonly referred to as wicking, attracts moisture along the loose fiber, through the coating, and into the paperboard. Not only does this cause a weakening of the paperboard, but also renders the paperboard product less effective as a moisture barrier.

Furthermore, by preventing moisture from wicking through the coating of corrugated paperboard and by preventing moisture from penetrating the coating under severe humidity or water soaking conditions, the flame treatment is very significant with respect to the ultimate strength of corrugated products in wet conditions. Accordingly, the flame treatment described in combination with the coating means, comprising an air knife coater (described below) is believed to be one of the key factors in the surprising success of the present invention as will be further illustrated below.

Flame treatment is most commonly used for treatment of molded plastic pieces such as bottles, tubing, and automotive parts. However, it is also widely used to treat films, foils, coated boards, and other substrates. In flame treatment, the paperboard surface is passed through a flame generated by the combustion of an ultra-lean mixture of a hydrocarbon at a speed sufficient to provide the desired properties. Like corona treatment, flame treatment also induces an ionized air stream which alters the surface of the paperboard as it impinges upon it.

Advantages of flame treatment over other surface treatments include freedom from ozone, pinholing, and unwanted treatment of the back of the board. Furthermore, the heat generated by the corona may dry out the fibers more than desired, causing them to expand.

The paperboard 14 is optionally fed to a fountain blade 18 to be coated with kaolin or other types of clay according to processes well known in the art. The addition of a $TiO_2$ containing clay coating to the paperboard whitens the paperboard and reduces the MVTR of the final product by approximately 50%. Typically, a clay coating on the product of the current invention will result in an MVTR of less than 1.0. If a clay coating is added at the fountain blade 18 it may be advantageous to pass the paperboard 14 through a second flame treater (not shown) downstream from said fountain blade to further reduce surface debris. As used herein, "downstream" refers to a point in the disclosed apparatus that is placed further along the paperboard path from the point of origin in the direction of the movement of the paperboard. A second flame treatment, however, is optional and not required by the present invention.

The paperboard 14 is then fed to and heated by a pre-heater 20. The pre-heater 20 applies heat to the surface of the paperboard 14, preferably to the surface to be coated, reducing the moisture content thereof. This aids in greater impregnation of the coating into the paperboard 14 since the coating tends to replace the driven-off moisture. The preheating is controlled so as not to drive off all the moisture, or too much moisture, particularly from the opposite face of the paperboard, as the opposite face could become so dry as to reattract moisture later and cause unwanted curling.

From the pre-heater 20, the paperboard 14 is fed through a series of rollers to coating means. There are four main kinds of modern coating processes: blade coating, air knife 24 coating, roll coating, and rod coating. Blade coating and air knife coating can be done in line or off the paperboard machine. Rod coating usually is done "off" the paperboard machine and can either be a complete coating or a first coat followed by an "off-machine" coating by the blade or air knife process. While all four coating methods may be used in the present invention, it has surprisingly been found that air knife 24 coating results in the most consistent coating.

In an air knife coating process, the coating mixture is applied by a metal roller and distributed by a thin, flat jet of air from a slot in a metal blade extending across the machine. In contrast, in blade coating the mixture is applied to the surface by rollers to give a thin, level coating. Excess coating is removed by a thin flexible metal blade as it smoothes the surface.

The coating composition used in this invention is a water-dispersible polymer suspension, preferably comprising 20%–40% solids. The preferred coating composition is an aqueous dispersion of a polyester resin; preferably, polyethylene terephthalate (PET).

A further preferred water-dispersible polymer is a water-soluble or water-dispersible polyester resin as described in U.S. Pat. No. 4,977,191 (Salsman), incorporated herein by reference. More specifically, U.S. Pat. No. 4,977,191 describes a water-soluble or water-dispersible polyester resin, comprising a reaction product of 20–50% by weight of waste terephthalate polymer, 10–40% by weight of at least one glycol and 5–25% by weight of at least one oxyalkylated polyol.

A further preferred water-dispersible polymer is a sulfonated water-soluble or water dispersible polyester resin composition as described in U.S. Pat. No. 5,281,630 (Salsman), incorporated herein by reference. Specifically, U.S. Pat. No. 5,281,630 describes an aqueous suspension of a sulfonated water-soluble or water dispersible polyester resin comprising a reaction product of 20–50% by weight terephathlate polymer, 10–40% by weight at least one glycol and 5–25% by weight of at least one oxyalkylated polyol to produce a prepolymer resin having hydroxyalkyl functionality, wherein the prepolymer resin is further reacted with about 0.10 mole to about 0.50 mole of an alpha, beta-ethylenically unsaturated dicarboxylic acid per 100 g of prepolymer resin and a thus produced resin, terminated by a residue of an alpha, beta-ethylenically unsaturated dicarboxyclic acid, is reacted with about 0.5 mole to about 1.5 mole of a sulfite per mole of alpha, beta-ethylenically unsaturated dicarboxylic acid residue to produce a sulfonated-terminated resin.

Yet another water-dispersible polymer is the coating described in U.S. Pat. No. No. 5,726,277 (Salsman), incorporated herein by reference. Specifically, U.S. Pat. No. No. 5,726,277 describes coating composition comprising a reaction product of at least 50% by weight of a waste terephthalate polymer and a mixture of glycols including an oxyalkylated polyol in the presence of a glycolysis catalyst wherein the reaction product is further reacted with a difunctional, organic acid and wherein the weight ratio of acid to glycols is in the range of 6:1 to 1:2.

While the above examples are provided as the preferred water-dispersible polymer coating compositions, other water-dispersible polymers are suitable for use in the present invention. By way of example only, and not meant to be limiting, further suitable water-dispersible compositions are described in U.S. Pat. No. 4,104,222 (Date, et al.), incorporated herein by reference. U.S. Pat. No. 4,104,222 describes a dispersion of a linear polyester resin obtained by mixing a linear polyester resin with a higher alcohol/ethylene oxide addition type surface-active agent, melting the mixture and dispersing the resulting melt by pouring it into an aqueous solution of an alkali under stirring. Specifically, this dispersion is obtained by mixing a linear polyester resin with a surface-active agent of the higher alcohol/ethylene oxide addition type, melting the mixture, and dispersing the resulting melt by pouring it into an aqueous solution of an alkanolamine under stirring at a temperature of 70°–95° C., said alkanolamine being selected from the group consisting of monoethanolamine, diethanolarnine, triethanolamine, monomethylethanolamine, monoethylethanolamine, diethylethanolamine, propanolamine, butanolamine, pentanolamine, N-phenylethanolamine, and an alkylolamine of glycerine, said alkanolamine being present in the aqueous solution in an amount of 0.2 to 5 weight percent, said surface-active agent of the higher alcohol/ethylene oxide addition type being an ethylene oxide addition product of a higher alcohol having an alkyl group of at least 8 carbon atoms, an alkyl-substituted phenol or a sorbitan monoacylate and wherein said surface-active agent has an HLB value of at least 12.

Likewise, by way of example, U.S. Pat. No. 4,528,321 (Allen) discloses a dispersion in a water immiscible liquid of water soluble or water swellable polymer particles and which has been made by reverse phase polymerisation in the water immiscible liquid and which includes a non-ionic compound selected from $C_{4\text{-}12}$ alkylene glycol monoethers, their $C_{1\text{-}4}$ alkanoates, $C_{6\text{-}12}$ polyalkylene glycol monoethers and their $C_{1\text{-}4}$ alkanoates.

It will be understood by those in the art that the various coatings will have varying heat tolerances and tensile strengths. It is within the skill in the art to select the appropriate coating for a given application without undue experimentation.

In the air knife 24, a jet of moderate to high velocity air impinges on the paperboard 14 supported by a roll, at a metering angle of approximately 45 degrees opposed to the paperboard movement. As described below, this angle will vary with changes in process conditions, material quality, and the desired properties of the coating. The jet shears the liquid film, and removes the excess as liquid, spray, or mist. This excess is then collected in a blow off containment system.

The angle between the center line of the air jet and a radial line passing through the impingement point (the metering angle) has a great effect on coating surface quality. In general, operating at too high an angle can cause vertical lines in the machine direction; while operation at too low an angle can cause cross machine lines that are one-half inch to one inch long.

In the air knife 24, a coating is applied in excess by a roller to the paperboard 14 at the applicator section. Water in the coating immediately begins to migrate at the interface of the wet coating and the paperboard 14 so that the coating at this point immediately becomes semi-dry or plastic. As the sheet of paperboard passes under the air knife 24 jet, part of the fluid coating is removed from the sheet by the air knife. There is a zone in the coating cross section where the coating makes the transition from the fluid to a semi-plastic coating, and it is in this area that the air knife shearing takes place. The exact point at which the shear takes place varies with the amount of energy of the air blast. At a very high pressure or velocity of air from the air knife, the air penetrates more into the coating, leaving less coating on the sheet. The typical air pressure used in the air knife is from two to nine pounds per square inch.

More importantly, the air knife 24 is a contour coater. Thus, it applies a relatively uniform coating thickness regardless of surface roughness. The air knife 24 minimizes variations in coating thickness, and thereby provides a more consistent MVTR of the paperboard 14.

The paperboard 14 is then passed to drying means, comprising a hood dryer 26 and an IR dryer 30. The hood dryer 26 may be heated by natural gas or otherwise, to dry and, depending on the nature of the coating, at least partially cure the coating. A first roller 22 and a second roller 28 move the paperboard through the dryer. These rollers 22, 28 may be heated by natural gas. The hood dryer 26 elevates the temperature of the coating to the curing temperature of the coating. The IR dryer 30 continues the drying and curing process begun in the hood dryer 26. It is believed that the molecules of the coating will begin to cross-link with each other and bind to the fibers of the paperboard during the drying process. Furthermore, moisture is removed from the coating, leaving solid polyester particles on the paperboard. As the water evaporates, the polymer becomes hydrophobic and it is believed that the hydroxyl groups in the polymer are bound to the cellulose in the paperboard 14. Once the polyester forms this hydrophobic coating, it is believed that it continues to cold flow which consequently decreases the MVTR of the paperboard 14.

While the polyester coating begins to cross-link in the dryer, it does not completely do so. This is beneficial in that if the paperboard 14 is fed into a corrugator at a later time, the polymer (e.g. polyester) will expand due to the heat involved in the corrugating process. This allows the coating to "breathe" and let any moisture remaining in the coated paperboard 14 to escape without damaging the film coating, as can occur in the prior art. As the paperboard 14 cools after being heated in the corrugator, the polymer coating once again forms a barrier.

Another benefit of the present coating is its resistance to scuffing or chimning. Chiming occurs in the beverage industry when the paperboard is scuffed and the round impression of beverage cans is made where the coating suffered the abrasion. Because the coating of the present invention is partially cured prior to such processes, it exhibits a remarkable degree of resistance to such scuffing.

The paperboard 14 is then passed to cooling means, comprising a curtain blower 32, axial fans 34, and a plurality of cooling rolls 36. The curtain blower 32 can be, for example, a squirrel cage blower. The curtain blower 32 blows heat from the coated paperboard 14 back towards the IR dryer 30. This prevents the paperboard 14 from transferring excessive amounts of heat to the cooling rolls 36. The fans 34 and cooling rolls 36 continue the curing process of the coating. The cooling rolls 36 are chilled by pumping a chilled liquid through them, lowering the temperature thereof to a maximum of 160 degrees Fahrenheit. As the coated paperboard 14 passes from the dryers, it may be in semi-molten state. The rapid drop in temperature provided by the cooling means 34, 36, 32 furthers the curing process of the coating.

Beyond the cooling rolls 36 optionally are the calender rolls 38, which consists of a stack of polished cast iron or steel rollers mounted one on top of the other. The function of the calender rolls 38 is to increase the smoothness and gloss of the surface of the paperboard as it passes between the rollers (not individually shown).

A reel drive 40 is provided downstream relative to the coater for assisting the machine drives (not shown) in driving the paperboard for winding on take-up roll 42.

Conditions are controlled and varied throughout the process to give the desired product. Thus, the weight and consistency of the coating on the paperboard is controlled by controlling the temperature of the various stages of the process, the machine speed, and the air knife pressure. The temperatures of the heating means 20, dryers 26, 30, and the cooling means 32, 34, 36 are controlled independently and can be varied to result in the desired coating properties by one of skill in the art with only routine experimentation. The machine speed can be controlled by controlling the speed of the machine drives. The air knife 24 pressure can typically be controlled by adjusting the discharge pressure or inlet volume, or both, of the air knife 24 by either a throttling device or by adjustment of the blower speed.

Furthermore, the coating weight is dependent upon the percent solids in the coating solution. While the percentage solids employed will vary with line speed and application pressure, typically a polymer dispersion of 20%–40% solids is suitable, with 27%–32% solids being preferred.

The paperboard product, once formed, can be collected on a roll 42 as shown in FIG. 1, or, in a continuous process, passed to an apparatus (not shown) for further processing. This further processing may include formation of the paperboard product into a package or blank or any other form, typically involving cutting, scoring, slitting, etc. Alternatively, the completed paperboard product can be passed to a corrugator for incorporation into corrugated board. A corrugator typically unwinds two or more continuous paper from rolls, presses flutes into the sheet of corrugating medium, applies adhesive to the tips of the flutes and bonds the sheet of paperboard to form corrugated board.

In the finished coated product, adherence of the coating to the paperboard is such that they are essentially inseparable, that is, peeling is practically impossible. The fibers of the paperboard will separate before the coating will peel from the paperboard. It is indeed surprising that rather than deteriorate the quality of the coating, the high temperatures involved in a corrugation apparatus actually improve the quality of the coating of the present invention as the elevated temperatures promote further curing of the coating.

In order to demonstrate the surprising results obtained as regards to the MVTR and strength of the paperboard products produced in accordance with the present invention, tests were conducted in which *the properties of the coated paperboard of the present invention were compared to those of the prior art under various conditions.

EXAMPLE I

The MVTR, recyclability, printability, and gluability of conventional waxed paperboard ("Waxed"); paperboard with low density polyethylene film applied at the corrugator (referred to as "LAMILUX"); paperboard with a two-part acrylic coating applied at the rate of about 4 pounds per MSF (referred to as "SPECTRA COAT"); a paperboard with an acrylic-based coating applied at the rate of 4.0–7.0 wet pounds per MSF (referred to as "MICHELMAN"); the PET coated paperboard (applied to a rate of 2.2 dry pounds per MSF) of the present invention (referred to as "POLYKRAFT"); and the polyester and clay coated paperboard of the present invention (referred to as "POLYKRAFT w/clay") were compared. The results of this comparison are set forth below.

TABLE I

|  | Waxed[2] | LAMILUX ™[5] | SPECTRA COAT ™[2] | MICHELMAN VAPORCOAT ™[2] | POLYKRAFT ™ | POLYKRAFT ™ w/clay |
|---|---|---|---|---|---|---|
| MVTR | Less than 2.0 | 2.0 | 2.1 | 5–20[3] | 2.6[4] | Less than 1.0[4] |
| Printability | No | No | No | No | Yes | Yes |
| Glueability | No | Hot melt | Hot melt | Hot melt only | Hot melt and cold set | Hot melt and cold set |
| Recyclability | No[1] | No | Yes | Yes, but at lower | Approximately | Approximately |

TABLE I-continued

|  | Waxed[2] | LAMILUX ™ [5] | SPECTRA COAT ™ [2] | MICHELMAN VAPORCOAT ™ [2] | POLYKRAFT ™ | POLYKRAFT ™ w/clay |
|---|---|---|---|---|---|---|
| under Typical Repulping Conditions |  |  |  | MVTR values, only 75% fiber recovered | 99% | 99% |

[1]While some waxed paperboards may be recyclable to some extent, the amount of wax that must be applied to achieve an MVTR less than 2.0 renders the paperboard unrecyclable.
[2]From published data
[3]Using TAPPI T-464
[4]Using TAPPI T-448
[5]From outside source In the above comparison, MICHELMAN and SPECTRA COAT were applied with a rod or blade coater; LAMILUX was applied as a film; and POLYMASTER was applied with an air knife in accordance with the present invention. Both the MICHELMAN and SPECTRA COAT coatings are compatible with the present invention, and it is suspected that had they been applied in accordance with the present invention, their properties would be similar to POLYMASTER.

EXAMPLE II

In order to further demonstrate the dramatic advantages achieved by the combination of air knife coating paperboard with a water-dispersible polyester after flame treating the paperboard in accordance with the present invention, a further test was conducted wherein the MVTR of PET coated, flame-treated paperboard and PET coated, unflame-treated paperboard was measured. The flame treatment of the paperboard resulted in a surprising 60% reduction in MVTR versus the paperboard that is not flame treated. Specifically, while coated paperboard that was not flame treated exhibited an MVTR of 5.4, a flame treated paperboard coated with the same coating exhibited an MVTR of 2.2. This is attributed directly to the flame-treatment of the paperboard prior to coating and the resulting removal of surface fibers and debris.

It will be appreciated that there are advantages to coating in-line. However, the same apparatus and process can be performed off-line, that is on a process line, separate in time or location from the one on which the paperboard is formed.

Many modifications and variations of the present invention will be readily apparent to those skilled in the art by consideration of the detailed description taken in conjunction with the annexed drawing. However, such modifications and variations do not depart from the spirit and scope of the present invention as defined by the appended claims.

What is claimed is:

1. A continuous process for forming a polyester film on a surface of a web of paperboard with a polyester polymer in an aqueous dispersion so as to lower the moisture vapor transfer rate of the paperboard and form a moisture barrier to the paperboard with a coating apparatus with a series of rollers for moving and conditioning the web comprising the following steps in sequence:

(a) flame-treating the surface of the paperboard to be coated to remove substantially all of any surface debris and fibers on said surface and to reduce the moisture content to an acceptable limit;

(b) heating the paperboard for a sufficient time and temperature to reduce the moisture content to the desired level;

(c) applying an aqueous dispersion with a water-dispersible polyester resin to said surface of the paperboard utilizing an application roller, and then distributing the aqueous dispersion across the paperboard with a jet of air from an air-knife so as to remove any excess dispersion across the paperboard with the jet of air from the air-knife so as to form a uniform layer of the aqueous dispersion across the paperboard and to remove any excess dispersion deposited by the roller;

(d) heating said paperboard to a temperature and for a time sufficient to at least partially cure said polyester;

(e) cooling the paperboard to at least a 160° F. to reduce the tackiness of said at least partially cured polyester;
   the temperatures, times and application of the polyester polymer and its distribution being controlled so as to deposit a film of the polyester on the paperboard that is at least partially cured so as to permit the subsequent repulping of the paperboard, and recycling of the paperboard into recycled paper products that can be readily glued and printed.

2. A method as claimed in claim 1, wherein said step of flame-treating comprises passing at least one surface of said paperboard though a flame generated by the combustion of an ultra-lean mixture of hydrocarbon gas.

3. A method as claimed in claim 1, wherein said polyester resin is polyethylene terephthlate.

4. A method as claimed in claim 1, wherein said water-dispersible polyester polymer is selected from the group consisting of:

a. the reaction product of 20–50% by weight of waste terephthalate polymer, 10–40% by weight of at least one glycol and 5–25% by weight of at least one oxyalkylated polyol;

b. the reaction product of 20–50% by weight terephathlate polymer, 10–40% by weight at least one glycol and 5–25% by weight of at least one oxyalkylated polyol to produce a prepolymer resin having hydroxyalkyl functionality, wherein the prepolymer resin is further reacted with about 0.10 mole to about 0.50 mole of an alpha, beta unsaturated dicarboxylic acid per 100 g of prepolymer resin and a thus produced resin, terminated by a residue of an alpha, beta-ethylenically unsaturated dicarboxyclic acid, is reacted with about 0.5 mole to about 1.5 mole of a sulfite per mole of alpha, beta-ethylenically unsaturated dicarboxylic acid residue to produce a sulfonated-terminated resin; and c. the reaction product of at least 50% by weight of a waste terephthalate polymer and a mixture of glycols including an oxyalkylated polyol in the presence of a glycolysis catalyst wherein the reaction product is further reacted with a difunctional, organic acid and wherein the weight ratio of acid to glycols is in the range of 6:1 to 1:2.

5. A method as claimed in claim 1, wherein said water dispersible polyester aqueous dispersion is selected from the group consisting of:
 a. the dispersion obtained by mixing a linear polyester resin with a surface-active agent of the higher alcohol/ethylene oxide addition type, melting the mixture, and dispersing the resulting melt by pouring it into an aqueous solution of an alkanolamine under stirring at a temperature of 70°–95° C., said alkanolamine being selected from the group consisting of monoethanolamine, diethanolamine, triethanolarnine, monomethylethanolamine, monoethylethanolamine, diethylethanolamine, propanolamine, butanolamine, pentanolamine, N-phenylethanolamine, and an alkylolamine of glycerine, said alkanolamine being present in the aqueous solution in an amount of 0.2 to 5 weight percent, said surface-active agent of the higher alcohol/ethylene oxide addition type being an ethylene oxide addition product of a higher alcohol having an alkyl group of at least 8 carbon atoms, an alkyl-substituted phenol or a sorbitan monoacylate and wherein said surface-active agent has an HLB value of at least 12; and
 b. a dispersion in a water immiscible liquid of water soluble or water swellable polymer particles and which has been made by reverse phase polymerisation in the water immiscible liquid and which includes a non-ionic compound selected from $C_{4-12}$ alkylene glycol monoethers, their $C_{1-4}$ alkanoates, $C_{6-12}$ polyalkylene glycol monoethers and their $C_{1-4}$ alkanoates.

6. A method as claimed in claim 1, wherein said aqueous dispersible with a water-dispersible polyester is between 20% and 40% solids, by weight.

7. A method as claimed in claim 6, wherein said aqueous dispersion with a water-dispersible polyester is between 27% and 32% solids, by weight.

8. A method as claimed in claim 1, further comprising the step of applying clay to said paperboard after the flame-treating of step (a).

9. A method as claimed in claim 8, further comprising the step of flame treating said paperboard a second time after applying clay.

10. The process of claim 1, wherein the heating step (d) and cooling step (e) is each conducted for a sufficient time, and at temperatures so that the polyester polymer is at least partially cross-linked.

11. The process of claim 10, further comprising corrugating the coated paperboard.

12. The process of claim 1 further comprising corrugating the coated paperboard.

* * * * *